(12) United States Patent
Lee (10) Patent No.: US 12,050,464 B2
(45) Date of Patent: Jul. 30, 2024

(54) ROBOT PAIRED WITH USER TO PERFORM SPECIFIC TASK

(71) Applicant: LG ELECTRONICS INC., Seoul (KR)

(72) Inventor: Dongeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 550 days.

(21) Appl. No.: 17/010,606

(22) Filed: Sep. 2, 2020

(65) Prior Publication Data

US 2021/0072750 A1 Mar. 11, 2021

(30) Foreign Application Priority Data

Sep. 5, 2019 (WO) ................ PCT/KR2019/011491

(51) Int. Cl.
*G05D 1/00* (2024.01)
*G06K 19/06* (2006.01)
*G06K 19/07* (2006.01)
*G06N 3/08* (2023.01)

(52) U.S. Cl.
CPC ..... *G05D 1/0088* (2013.01); *G06K 19/06028* (2013.01); *G06K 19/06037* (2013.01); *G06K 19/0723* (2013.01); *G06N 3/08* (2013.01)

(58) Field of Classification Search
CPC ........ G05D 1/0088; B25J 9/0003; G06N 3/08
See application file for complete search history.

(56) References Cited

U.S. PATENT DOCUMENTS

| | | | | |
|---|---|---|---|---|
| 9,741,010 | B1* | 8/2017 | Heinla | G06Q 10/083 |
| 10,289,076 | B2* | 5/2019 | Kim | G05B 13/027 |
| 2016/0354165 | A1 | 12/2016 | Uenoyama et al. | |
| 2018/0300676 | A1* | 10/2018 | Peterson | G06Q 10/0832 |
| 2019/0043009 | A1* | 2/2019 | Ferguson | G06Q 10/0832 |
| 2019/0047515 | A1* | 2/2019 | Ferguson | B60R 25/25 |
| 2020/0053325 | A1* | 2/2020 | Deyle | H04N 7/185 |
| 2022/0152828 | A1* | 5/2022 | Kim | B25J 9/1666 |

FOREIGN PATENT DOCUMENTS

| | | | | | |
|---|---|---|---|---|---|
| CN | 111716348 | A | * | 3/2019 | B25J 11/00 |
| CN | 109940621 | A | * | 6/2019 | B25J 11/00 |
| CN | 210436148 | U | * | 8/2019 | B25J 11/00 |

(Continued)

OTHER PUBLICATIONS

Starship, "Starship FAQ", 2018 (Year: 2018).*

*Primary Examiner* — Russell Frejd
*Assistant Examiner* — Brittany Renee Peko
(74) *Attorney, Agent, or Firm* — Birch, Stewart, Kolasch & Birch, LLP (57) ABSTRACT

A robot including an input interface configured to receive a service identifier in response to a service request; a camera configured to capture a video of a user who has presented the service identifier; a transceiver configured to receive service information associated with the service identifier; and a processor configured to identify the user who has presented the service identifier from the video using an artificial neural network based learning model; and in response to successfully identifying the user, perform a task corresponding to the service request for the user based on the service information.

17 Claims, 5 Drawing Sheets

(56) References Cited

FOREIGN PATENT DOCUMENTS

| KR | 10-2010-0006975 A | 1/2010 | | |
|---|---|---|---|---|
| KR | 10-2011-0103537 A | 9/2011 | | |
| KR | 10-2018-0024576 A | 3/2018 | | |
| KR | 10-2018-0039439 A | 4/2018 | | |
| KR | 10-2018-0054528 A | 5/2018 | | |
| KR | 10-2018-0080499 A | 7/2018 | | |
| WO | WO2019169643 A1 * | 3/2018 | ............... | B07C 5/02 |
| WO | WO2019023704 A1 * | 6/2018 | ............... | G05D 1/02 |

* cited by examiner

ROBOT PAIRED WITH USER TO PERFORM SPECIFIC TASK

CROSS-REFERENCE TO RELATED APPLICATION

Pursuant to 35 U.S.C. § 119, this application claims the benefit of an earlier filing date and priority to PCT International Application No. PCT/KR2019/011491 filed on Sep. 5, 2019, the contents of which are incorporated by reference herein in its entirety.

BACKGROUND OF THE INVENTION

1. Field of the Invention

The present disclosure relates to a robot, and more particularly, to a robot for performing a task based on a service request of a user, a robot control method, and a system for controlling the robot accordingly.

2. Discussion of the Related Art

In recent years, a customer service using a robot has been provided in various places, such as an airport, a hospital, a shopping mall, a hotel, and a restaurant. For example, an airport robot guides passengers to a boarding gate and moves heavy suitcases, and a hospital robot guides patients to an examination room and helps with scheduling a next appointment with a doctor. In another example, a concierge robot guides guests to their assigned rooms and provides room service, and a serving robot serves food ordered by customers before the food becomes cold.

Korean Patent Application Publication No. 10-2010-0006975 (hereinafter referred to as 'Related Art 1") discloses a mobile receptionist robot and a system thereof. Related Art 1 discloses that a central control part creates a current location based on standard location information, and then moves according to a set route and a detection signal of a sensor part, and provides reception service corresponding to the user request information.

Korean Patent Application Publication No. 10-2011-0103537 (hereinafter referred to as 'Related Art 2") discloses a guide service method of a mobile robot. Related Art 2 discloses a mobile robot that directly promotes and explains a guide book while moving with visitors according to the setting and command of a control server.

However, the robots disclosed in Related Art 1 and Related Art 2 only guide users while moving according to the set route or the setting of a control server, but do not identify users who have requested a service or provide the identified users with a necessary service.

SUMMARY OF THE INVENTION

Accordingly, embodiments of the present disclosure are directed to providing a robot that identifies a user who has requested a service and performs a necessary service for the identified user.

Embodiments of the present disclosure are also directed to providing a robot that is paired with the identified user to perform a task corresponding to a service request.

Embodiments of the present disclosure are directed to providing a robot that identifies a user paired with a robot using an object recognition model based on an artificial neural network.

The present disclosure is not limited to what has been described above, and other aspects not mentioned herein will be apparent from the following description to one of ordinary skill in the art to which the present disclosure pertains.

A robot according to an embodiment of the present disclosure may include an input interface configured to acquire a service identifier assigned in response to a service request of a user, a camera configured to capture a video, a transceiver configured to receive service information associated with the service identifier, and a processor.

The processor may be configured to analyze a video to identify a user who has presented a service identifier from the video, and to perform a task corresponding to a service request for a user based on service information.

A robot control method according to another embodiment of the present disclosure may include acquiring a service identifier assigned in response to a service request of a user, acquiring service information associated with the service identifier based on the service identifier, analyzing a video captured using a camera to identify a user who has presented a service identifier from the video, and performing a task corresponding to a service request for a user based on service information.

A robot control system according to another embodiment of the present disclosure may include a server that assigns a robot to process a service request of a user, and a robot that performs a task corresponding to the service request.

Aspects which can be achieved by the present disclosure are not limited to what has been disclosed hereinabove, and other aspects can be clearly understood from the following description by those skilled in the art to which the present disclosure pertains.

According to embodiments of the present disclosure, since a user can receive various services provided by a robot by presenting a service identifier assigned in response to a service request, a user can use the service easily and conveniently.

Further, according to the embodiments of the present disclosure, additional tasks necessary for a user are automatically performed according to results of a user identification, thereby enhancing user convenience.

Further, according to the embodiments of the present disclosure, since a user is identified based on an object recognition model, accuracy is enhanced.

In addition, since a user is identified on the basis of an artificial neural network based learning model, accuracy may be enhanced.

The effects of the present disclosure are not limited to those mentioned above, and other effects which are not mentioned will be clearly understood to those skilled in the technical field to which the present disclosure pertains, from the following description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Hereinafter, embodiments disclosed herein will be described in detail with reference to the accompanying drawings, and the same reference numerals are given to the same or similar components and duplicate descriptions thereof will be omitted.

The terminology used herein is used for the purpose of describing particular exemplary embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Figure 1:
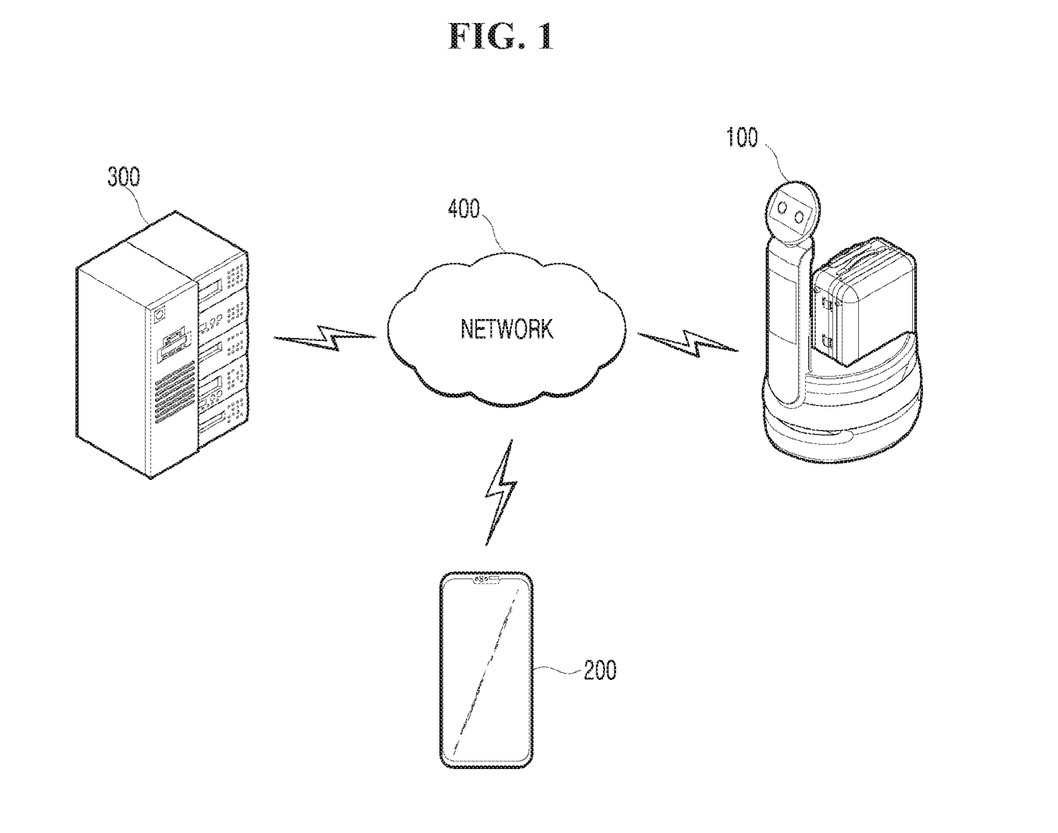
FIG. 1 is a diagram showing an example of a robot control environment including a robot, a terminal, a server, and a network that interconnects the same according to an embodiment.

FIG. 1 is a diagram showing an example of a robot control environment including a robot, a terminal, a server, and a network that interconnects the same according to an embodiment. Referring to FIG. 1, the robot control environment may include a robot 100, a terminal 200, a server 300, and a network 400. Various electronic devices other than the devices shown in FIG. 1 may be interconnected through the network 400 and operated.

The robot 100 refers to a machine which automatically handles a given task by its own ability, or which operates autonomously. In particular, a robot having a function of recognizing an environment and performing an operation according to its own judgment is referred to as an intelligent robot.

In addition, the robot 100 can be classified into industrial, medical, household, and military robots, according to the purpose or field of use. Further, the robot 100 may include an actuator or a driver including a motor in order to perform various physical operations, such as moving joints of the robot. Moreover, a movable robot may include, for example, a wheel, a brake, and a propeller in the driver thereof, and through the driver can thus be capable of traveling on the ground or flying in the air.

By employing AI technology, the robot 100 can be implemented as a guide robot, a transport robot, a cleaning robot, a wearable robot, an entertainment robot, a pet robot, or an unmanned flying robot. In addition, the robot 100 may include a robot control module for controlling its motion. In more detail, the robot control module may correspond to a software module or a chip that implements the software module in the form of a hardware device.

Further, using sensor information obtained from various types of sensors, the robot 100 can obtain status information of the robot 100, detect (recognize) the surrounding environment and objects, generate map data, determine a movement route and drive plan, determine a response to a user interaction, or determine an operation. Here, in order to determine the movement route and drive plan, the robot 100 can use sensor information obtained from at least one sensor among LiDAR, radar, and a camera.

In addition, the robot 100 can perform the operations above by using a learning model configured by at least one artificial neural network. For example, the robot 100 can recognize the surrounding environment and objects by using the learning model, and determine its operation by using the recognized surrounding environment information or object information. Here, the learning model can be trained by the robot 100 itself or trained by an external device such as the server 300.

Further, the robot 100 can perform the operation by generating a result by employing the learning model directly, but can also perform the operation by transmitting sensor information to an external device such as the server 300 and receiving a result generated accordingly. The robot 100 can also determine the movement route and drive plan by using at least one of object information detected from the map data and sensor information or object information obtained from an external device, and drive according to the determined movement route and drive plan by controlling its driver.

In addition, the map data may include object identification information about various objects disposed in the space in which the robot 100 drives. For example, the map data may include object identification information about static objects such as wall and doors and movable objects such as a flowerpot and a desk. In addition, the object identification information may include the name, type, distance, location, and so on.

Also, the robot 100 can perform the operation or drive by controlling its driver based on the control/interaction of the user. Further, the robot 100 can obtain intention information of the interaction according to the user's motion or spoken utterance, and perform an operation by determining a response based on the obtained intention information.

In addition, the terminal 200 is an electronic device operated by a user or an operator, and the user can drive an application for controlling the robot 100, or access an application installed in an external device, including the server 300, using the terminal 200. For example, the terminal 200 can acquire a service request of a user through an application and transmit the service request to the robot 100 and/or the server 300 through the network 400.

The terminal 200 can also receive status information of the robot 100 from the robot 100 and/or the server 300 through the network 400. Further, the terminal 200 can provide, to the user, functions of controlling, managing, and monitoring the robot 100 through the application installed therein.

In more detail, the terminal 200 may include a communication terminal capable of performing the function of a computing device. For example, the terminal 200 may be a desktop computer, a smartphone, a laptop computer, a tablet PC, a smart TV, a mobile phone, a personal digital assistant (PDA), a media player, a micro server, a global positioning system (GPS) device, an electronic book terminal, a digital broadcasting terminal, a navigation device, a kiosk, an MP3 player, a digital camera, an electrical home appliance, or any other mobile or non-mobile computing devices, without being limited thereto. In addition, the terminal 200 may be a wearable device having a communication function and a data processing function, such as a watch, glasses, a hair band, or a ring. Also, the terminal 200 is not limited to the above, and any terminal capable of performing web browsing may be used without limitation.

In addition, the server 300 may include a web server or an application server configured to control the robot 100 and to control the robot 100 remotely by using the application or the web browser installed in the terminal 200. The server 300 may also be a database server that provides large amount of data used for applying various artificial intelligence algorithms and data relating to a robot control.

In more detail, artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

An ANN may include an input layer, an output layer, and optionally one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

In addition, the objective of training an ANN is to determine a model parameter for significantly reducing a loss function. The loss function may be used as an indicator for determining an optimal model parameter in a learning process of an ANN. Machine learning may be classified into supervised learning, unsupervised learning, and reinforcement learning depending on the learning method.

Supervised learning may refer to a method for training the artificial neural network with training data that has been given a label. In addition, the label may refer to a target answer (or a result value) to be inferred by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The network 400 may serve to connect the robot 100, the terminal 200, and the server 300 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long-distance communications. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as Internet and a private network such as a secure corporate private network, for example, a multiple network environment. Access to the network 400 can be provided via one or more wired or wireless access networks. Furthermore, the network 400 may support the Internet of things (IoT) for 5G communication or exchanging and processing information between distributed elements such as objects.

Figure 2:
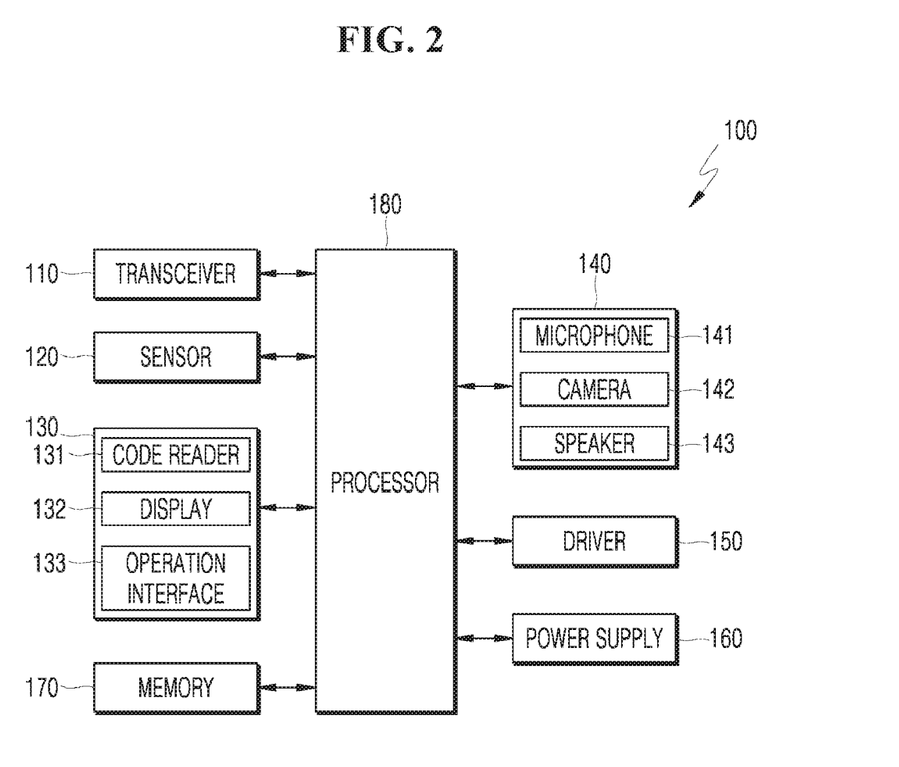
FIG. 2 is a block diagram of a robot according to an embodiment.

Next, FIG. 2 is a block diagram of a robot according to an embodiment. As shown, the robot 100 may include a transceiver 110, a sensor 120, a user interface 130, an input and output interface 140, a driver 150, a power supply 160, a memory 170, and a processor 180. The robot 100 according to the embodiment may include a larger or smaller number of elements than the above elements shown in FIG. 2.

The transceiver 110 can transmit/receive data with external devices such as other AI devices or the server 300 by using wired or wireless communication technology. For example, the transceiver 110 can transmit or receive sensor data, user input, a learning model, a control signal, and the like with the external devices. The AI device may also, for example, be realized by a stationary or a mobile device, such as a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set top box (STB), a DMB receiver, a radio, a washer, a refrigerator, digital signage, a robot, or a vehicle.

The communications technology used by the transceiver 110 may be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC). Further, the transceiver 110 is linked to the network 400 to provide a communication interface necessary to provide transmission and reception signals between the robot 100 and/or the terminal 200 and/or the server 300 in the form of packet data. Further, the transceiver 110 may be a device including hardware and software required to transmit and receive a signal such as a control signal or a data signal, through wired/wireless connection with other network devices. Further, the transceiver 110 can support various kinds of object intelligence communications (such as Internet of things (IoT), Internet of everything (IoE), and Internet of small things (IoST) and support communications such as machine to machine (M2M) communication, vehicle to everything communication (V2X), and device to device (D2D) communication.

The transceiver 110 can also receive service information requested by a user from the server 300 under the control of the processor 180. Further, the transceiver 110 can receive service information associated with a service identifier assigned in response to a service request of a user from the server 300 under the control of the processor 180. The transceiver 110 can also receive task information for performing a service requested by a user from the server 300.

In addition, the sensor 120 can acquire at least one of internal information of the robot 100, surrounding environment information of the robot 100, or user information by using various sensors. The sensor 120 can also provide the robot 100 with sensor data allowing the robot 100 to create a map based on SLAM and to confirm the current location of the robot 100.

Further, the sensor 120 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or weight sensor.

Also, the sensor 120 can acquire various kinds of data, such as learning data for model learning and input data used when an output is acquired using a learning model. The sensor 120 can further obtain raw input data. In this instance, the processor 180 or the learning processor can extract an input feature by preprocessing the input data.

As shown, the user interface 130 may include a code reader 131, a display 132, and an operation interface 133. In particular, the code reader 131 can acquire various code information by a tagging operation or a scan operation. For example, the code reader 131 may be disposed as a separate device in the main body of the robot 100 or may be disposed in one region of the display 132

In addition, the code reader 131 can acquire code information presented by a user. In one example, a code includes a bar code, a quick response (QR) code (quick response code), a near field communication (NFC) tag, and a radio-frequency identification (RFID) tag. Further, the code information may include a service identifier assigned in response to a service request of a user. The robot 100 can also confirm service information to be provided to the user on the basis of the inputted code information.

In addition, the display 132 can output status information of the robot 100 under the control of the processor 180. In one example, the display 132 may form an interlayer structure together with a touch pad in order to constitute a touchscreen. In this instance, the display 132 can also be used as an operation interface 133 capable of inputting information through a touch of a user.

Further, the display 132 may be configured with a touch-sensitive display controller or other various input and output controllers. In more detail, the touch recognition display controller can provide an output interface and an input interface between the robot 100 and the user, and the touch recognition display controller can transmit and receive electrical signals to and from the processor 180. Also, the touch-sensitive display controller can display visual output to the user, and the visual output may include texts, graphics, images, videos, and combination thereof. The display 132 may also be a predetermined display member, such as a touch-sensitive organic light emitting display (OLED), liquid crystal display (LCD), or light emitting display (LED).

In addition, the display 132 can output a user interface screen for interaction between the robot 100 and the user under the control of the processor 180. For example, the display 132 can display a message on a user interface screen and cause the screen to blink in response to the display 132 not identifying the user from the video.

Also, the operation interface 133 may include a plurality of manipulation buttons, and transmit a signal corresponding to an input button to the processor 180. Such an operation interface 133 may be configured as a sensor, a button, or a switch structure which recognizes a touch or a pressing operation of the user. In addition, the operation interface 133 can transmit an operation signal by user operation in order to confirm or change various kinds of information related to driving of the robot 100 displayed on the display 132.

Further, the input and output interface 140 can acquire and output input and output data related to visual, auditory, or tactile sensation, and may include an input interface and an output interface. In more detail, the input interface can acquire various kinds of data and may include a camera 142 for inputting a video signal and a microphone 141 for receiving an audio signal. Here, the camera 142 or the microphone 141 may be regarded as a sensor, and therefore a signal acquired from the camera 142 or the microphone 141 may be sensing data or sensor information. For example, the camera 142 may include a 2D CAM.

Also, the input interface uses various input devices such as the code reader 131, the display 132, the operation interface 133, the microphone 141, the camera 142, or the sensor 120 so that a service identifier presented by a user can be acquired as input data in a form suitable for the operation method of each input device. The input interface can also acquire various kinds of data, such as learning data for model learning and input data used when an output is acquired using a learning model. Further, the input interface can acquire raw input data. The processor 180 or a learning processor can also extract an input feature from the input data as preprocessing.

Further, the output interface can generate an output related to visual, auditory or tactile sensation. For example, the output interface may include a display 132 for outputting visual information, a speaker 143 for outputting aural information, and a haptic module for outputting tactile information.

In addition, the driver 150 is a module which drives the robot 100 and may include a driving mechanism and a driving motor which moves the driving mechanism.

The power supply 160 is applied with external power and internal power to supply the power to each component of the robot 100, under the control of the processor 180. The power supply 160 also includes a battery. For example, the battery may be an internal battery or a replaceable battery. The battery may also be charged by a wired or wireless charging method and the wireless charging method may include a magnetic induction method or a self-resonance method.

Further, the memory 170 can store data supporting various functions of the robot 100. The memory 170 can also store various information generated in processing a service requested by a user. For example, the memory 170 may include a service identifier, service information associated with the service identifier, task information, information for identifying a user, and route information.

In addition, the memory 170 can store input data acquired by the sensor 120 or the input interface, learning data, a learning model, and learning history. For example, the memory 170 can store map data. Also, the memory 170 may include magnetic storage media or flash storage media, without being limited thereto. The memory 170 may also include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Further, the processor 180 is a type of a central processor unit which may drive control software provided in the memory 170 to control overall operation of the robot 100. The processor 180 includes all types of devices capable of processing data. For example, the processor 180 can refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

Further, the processor 180 can determine at least one executable operation of the robot 100, based on information determined or generated using a data analysis algorithm or a machine learning algorithm. In addition, the processor 180 can control components of the robot 100 to perform the determined operation. To this end, the processor 180 can request, retrieve, receive, or use data of the learning processor or the memory 170, and control components of the robot 100 to execute a predicted operation or an operation determined to be preferable of the at least one executable operation.

When a connection with an external device is needed to perform a determined operation, the processor 180 can generate a control signal for controlling the external device and transmit the generated control signal to the external device. The processor 180 also obtains intention information about user input, and can determine a requirement of a user based on the obtained intention information.

Further, the processor 180 uses at least one of a speech to text (STT) engine for converting a voice input into a character string or a natural language processing (NLP) engine for acquiring intention information of a natural language, and can acquire intention information corresponding to a user input.

In an embodiment, the at least one of the STT engine or the NLP engine may be composed of artificial neural networks, some of which are trained according to a machine learning algorithm. In addition, the at least one of the STT engine or the NLP engine may be trained by the learning processor 330, trained by a learning processor 330 of a server 300, or trained by distributed processing thereof.

Further, the processor 180 can collect history information including about operation of the robot 100 or user feedback about the operation of the robot, store the same in the memory 170 or the learning processor, or transmit the same to an external device, such as the server 300. The collected history information can also be used to update a learning model.

In addition, the processor 180 can control at least some of the elements of the robot 100 in order to drive an application program stored in the memory 170. Furthermore, the processor 180 can combine and operate two or more of the elements of the robot 100 in order to drive the application program.

The processor 180 can also be configured to analyze a video captured by the camera 142 to identify a user who has presented a service identifier from the corresponding video, and to perform a task corresponding to a service request for a user on the basis of service information. The processor 180 may be further configured to control the camera 142 to capture a video of a user who has presented a service identifier, and to register the video of the user as identification information of the user paired with the robot 100.

The processor 180 can also create route information based on the map data stored in the memory 170. The processor 180 can be further configured to perform a task corresponding to a service request of a user by using the created route information and configured to simultaneously perform a plurality of tasks.

In one example, the robot 100 may include a learning processor. In more detail, the learning processor can train a learning model constituted by an artificial neural network using learning data. Here, the trained artificial neural network can be referred to as a learning model. The trained model can also be used to infer a result value with respect to new input data rather than learning data, and the inferred value can be used as a basis for a determination to perform an operation of classifying the detected hand motion. For example, the learning model may be an object recognition model that recognizes an object from an inputted video.

The learning processor can also perform AI processing together with the learning processor 320 of the server 300. The learning processor may also be realized by an independent chip or may be included in the processor 180. Further, the learning processor may include a memory that is integrated into the robot 100 or separately implemented. Alternatively, the learning processor may be implemented using the memory 170, an external memory directly coupled to the robot 100, or a memory maintained in an external device.

Figure 3:
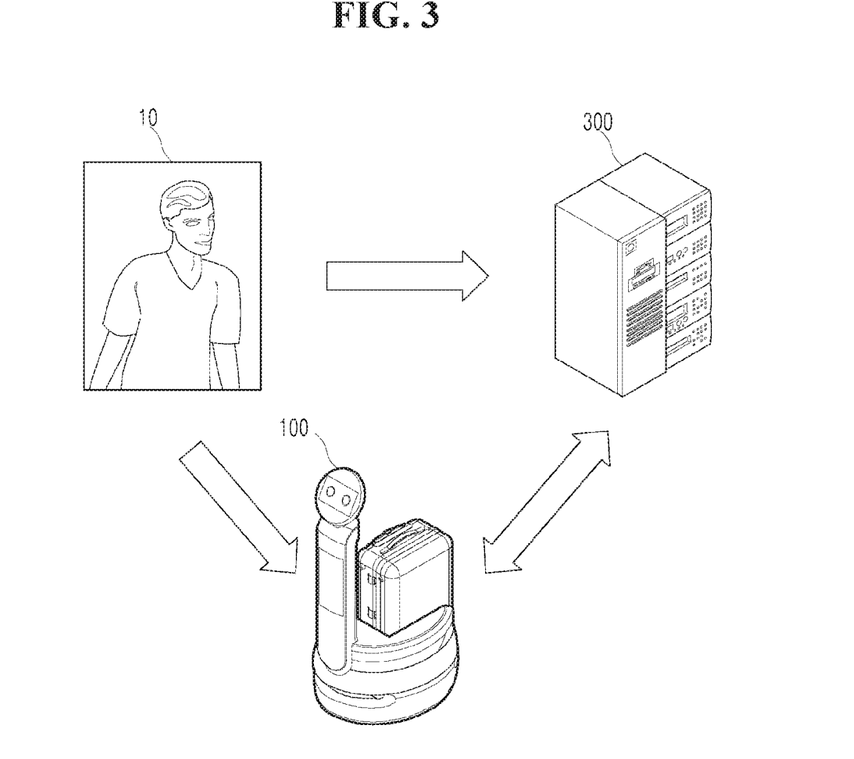
FIG. 3 is an illustration of an information flow between a user, a robot, and a server according to an embodiment.

Next, FIG. 3 is an illustration of an information flow between a user 10, a robot 100, and a server 300 according to an embodiment. In particular, the robot 100 can provide a service to a user at a given place. For example, the robot 100 can introduce a route, store and transport articles, and provide a reservation service to a customer at a place such as a hotel, an airport, or a hospital.

The service refers to an activity to aid in the convenience of the user 10 at a given place. For example, if a given place is a hotel, the services can include check-in and check-out services, luggage storage and transport services, paging services, and facility reservation services. The user 10 can also designate a time when a service is needed at the time of requesting a service.

In addition, the user 10 transmits a service request to the server 300 through the terminal 200. In another example, the user 10 can request a service directly from the robot 100. Further, the user 10 corresponds to various subjects interacting with the robot 100. For example, the user 10 can include a subject requesting a service and a subject receiving a service, and the user 10 is not limited to a person, and may be another intelligent robot.

When the server 300 receives a service request from the user 10, the server 300 can control the robot 100 to provide a corresponding service. For example, the server 300 can dispose an idle robot closest to the current location of the user 10 as the robot 100 for the user 10. The server 300 can also instruct the robot 100 to move toward the user 10.

Further, the server 300 can generate information related to a service and transmit the information to the robot 100. For example, the server 300 can transmit a corresponding service identifier and service information to the robot 100. In one example, the server 300 can transmit information related to a service to the robot 100 at the request of the robot 100. Additionally, the server 300 can deliver a service identifier to the user 10 through the terminal 200.

In one example, the user 10 can request a service directly from the robot 100. For example, the user 10 can request a service from a robot passing nearby or an idle robot waiting in a waiting place. In another example, the user 10 can deliver a service request to the robot 100 through the user interface 130 and/or the input interface of the robot 100. In one example, the user 10 can request the robot 100 passing nearby to call the robot 100 to provide a service for the user.

In addition, the robot 100 receiving a service request directly from the user 10 can transmit the corresponding service request to the server 300. The server 300 can determine and dispose another robot 100 as a robot to provide the received service as needed. The server 300 can also deliver the service identifier assigned in response to a service request to the user 10 through the robot 100 or another robot 100, or through the terminal 200 of the user 10.

In order to start a service, the user 10 can present a service identifier (service ID) to the robot 100. In more detail, the service identifier may include a service number given to the service requested by the user 10. For example, for the hotel robot 100, the service identifier may include room information assigned to the user 10. Here, the service number may be represented by a service code. Additionally, the service identifier may include a user identifier (User ID) given to the user 10 using a given place. For example, the user identifier may include membership information such as a nickname of the user 10 and a user identification number.

The user 10 can also present a service identifier to the robot 100 through an application installed in the terminal 200. For example, for a hotel, the user 10 can present a service identifier to the robot 100 by tagging the room key card in which the room information is stored on the code reader 131.

The robot 100 can also perform a task corresponding to a service request in order to provide a service to a user. While performing the task, the robot 100 can transmit a current location, an operating state, an article storage state, a completion of a task, and various sensor information to the server 300 and/or the terminal 200. The task will be described later with reference to FIG. 4 and FIG. 6.

Figure 4:
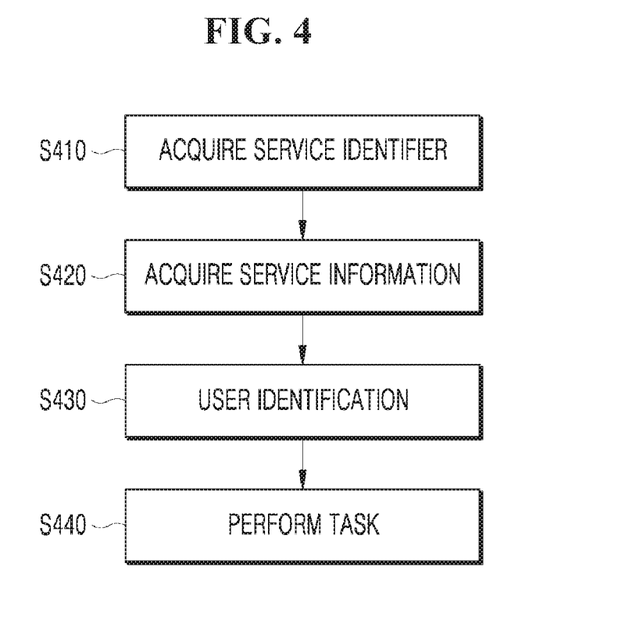
FIG. 4 is a flowchart of a robot control method according to an embodiment.

Next, FIG. 4 is a flowchart of a robot control method according to an embodiment. As shown, the robot control method according to an embodiment includes acquiring a service identifier assigned in response to a service request of a user (S410), acquiring service information associated with the service identifier based on the service identifier (S420), analyzing a video captured using a camera to identify a user who has presented a service identifier from the video (S430), and performing a task corresponding to a service request based on service information (S440).

In step S410, the robot 100 can acquire a service identifier assigned in response to a service request of a user. For example, the user can present the terminal 200, in which the service identifier is stored, to the robot 100 through the input interface of the robot 100, or transmit the service identifier stored in the terminal 200 through the transceiver 110 so as to deliver the service identifier assigned in response to the service request of the user to the robot 100.

In step S410, the input interface of the robot 100 can use various input devices such as the code reader 131, the display 132, the operation interface 133, the microphone 141, the camera 142, or the sensor 120 described above so that the service identifier presented by the user can be acquired as input data. For example, the user can tag the terminal 200 in which the service identifier is displayed on the code reader 131. In another example, the user can provide the service identifier as a voice input through the microphone 141.

Further, the service identifier may include a user identifier (User ID) assigned to a user using a given place. Additionally, the service identifier may include a service number given to the service requested by the user. For example, for the hotel robot 100, the service identifier can include room information assigned to the user. When a guest tags a room key card (for example, an NFC card) storing room information on the code reader 131, the robot 100 can acquire a room number assigned to a user.

In step S420, the robot 100 can acquire service information associated with a service identifier based on the service identifier acquired in step S410. For example, the robot 100 can acquire service information mapped to a service identifier based on the service identifier acquired in step S410.

The service information may include service detail information. Further, the service detail information is service specification information that defines the factors used to provide a service in a static manner. For example, the service detail information may include service classification information, service place information, service scheduled period information (for example, scheduled start time information and scheduled end time information), and service reservation information.

The service information may also include personal information of a user. For example, personal information may include a user name, a video of a user, a user identifier (ID), a scheduled period of visit, a visit history, service use history, a service preference, a service feedback history, and contact information (for example, a phone number, an e-mail, and an address), service information being currently used, current location information, schedule information, reservation service information, and biometric information.

Additionally, the service information may include service status information. Service status information includes information that is dynamically created and updated while providing a service after the service is started. For example, the service status information may include an identifier (Robot ID) of the robot 100 in charge of the current service, route information of the robot 100, location information of the robot 100, status information of the robot 100, an actual service start time, an elapsed time after the start of service, an estimated time to complete service, a service progress, a service progress status, a running task information, unexpected situation information, and error information. Here, the robot 100 in charge of the current service means the robot 100 paired with a current user.

In addition, the server 300 can manage a service information database. Then, the robot 100 can transmit a service information request including a service identifier to the server 300 and receive service information mapped to the service identifier from the server 300 in response thereto.

Further, the robot 100 can store and manage a service information table in the memory 170. The robot 100 can also retrieve and update the service information table stored in the memory 170 using a service identifier as a key.

In addition, steps S410 and S420 can be performed sequentially or be integrated into one step and performed simultaneously. For example, the service information may include a service identifier, and the robot 100 can receive service information including a service identifier from the server 300 at one time through the transceiver 110. In another example, the service information may include a service identifier, and the robot 100 can read service information including a service identifier from the terminal 200 at one time through the code reader 131.

Additionally, in step S420, in response to the robot 100 acquiring service information associated with a service identifier, the robot 100 can determine that the corresponding service identifier is valid. In this instance, the robot 100 can control the camera 142 according to a user request to acquire the biometric information of the user such as a face, an iris or a fingerprint and store the biometric information as user information. In one example, in processing the service request of the user who stores the biometric information, the processor 180 can acquire the biometric information of the user instead of the service identifier in step S410, and the processor 180 can receive the service information associated with the biometric information in step S420.

In response to a failure to acquire the service information associated with the service identifier in step S420, the robot 100 can determine that the corresponding service identifier is invalid, and may not proceed with subsequent steps. In this instance, the processor 180 can control the display 131 to output a message informing that the service identifier is invalid.

In step S430, the robot 100 can pair the user who has presented a service identifier with the robot 100. Pairing a user with the robot 100 means setting the robot 100 as a robot in charge of the corresponding user. When a specific user and the robot 100 are paired, only the paired user occupies the robot 100 while being provided a service indicated by a service identifier acquired in step S410. That is, a user except the paired user may not be paired with the robot 100.

Also, step S430 may include capturing a video of a user who has presented a service identifier using the camera 142. For example, the processor 180 can control the camera 142 to capture a video of a user who has presented the service identifier in step S410. The video of the user may include a face video, a whole body video, a back view and a side view of a user.

Step S430 may also include registering the video of the user who has presented the service identifier as identification information of the user paired with the robot 100. For example, the processor 180 can store the acquired video of the user in a user information item of service information mapped to the service identifier provided by the user in a service information table stored in the memory 170.

The robot 100 can also determine sensor information sensed in the sensor 120 and status information of the robot 100 based on input data acquired through the input interface, and store the determined status information in the memory 170. For example, the status information of the robot 100 may include a flag (for example, FLAG ON or OFF) indicating whether it is paired, user information (for example, User ID and video) of a paired user, service information being currently performed (for example, a service identifier) and an operating mode (for example, a driving mode, a stop mode, a security mode, and an idle mode).

When pairing with a user is completed in step S430, the processor 180 can determine the status information of the robot 100 and update the status information stored in the memory 170 with the newly determined status information. The processor 180 can then control the transceiver 110 to transmit the updated status information to the server 300. Further, the server 300 can store the updated status information in the robot control database that stores data for monitoring the robot 100. In addition, the server 300 can also reflect the updated status information in the service information database.

In response to the user and the robot 100 being paired, the robot 100 identifies the user who is paired with the robot 100 in the vicinity in real time while providing a service in steps S430 and S440, and can perform the task corresponding to a service request for the paired user. In step S430, the robot 100 can analyze the video captured using the camera 142 to identify a user who is paired with the robot 100 from the video.

The robot 100 can also capture a video through the camera 142 under the control of the processor 180. Here, the video includes a video of the surroundings of the robot 100. For example, the video includes a front video of the robot 100.

In addition, the robot 100 identifies a user in step S430 continuously and in real time while performing the task corresponding to the service request in step S440. The robot 100 also analyzes a video captured by the camera 142 under the control of the processor 180 and finds a paired user in the video. The identification is determined to be successful in response to the processor 180 finding a paired user in the video, and the identification is determined to have failed in response to the processor 180 not finding a pair user in the video.

Figure 5:
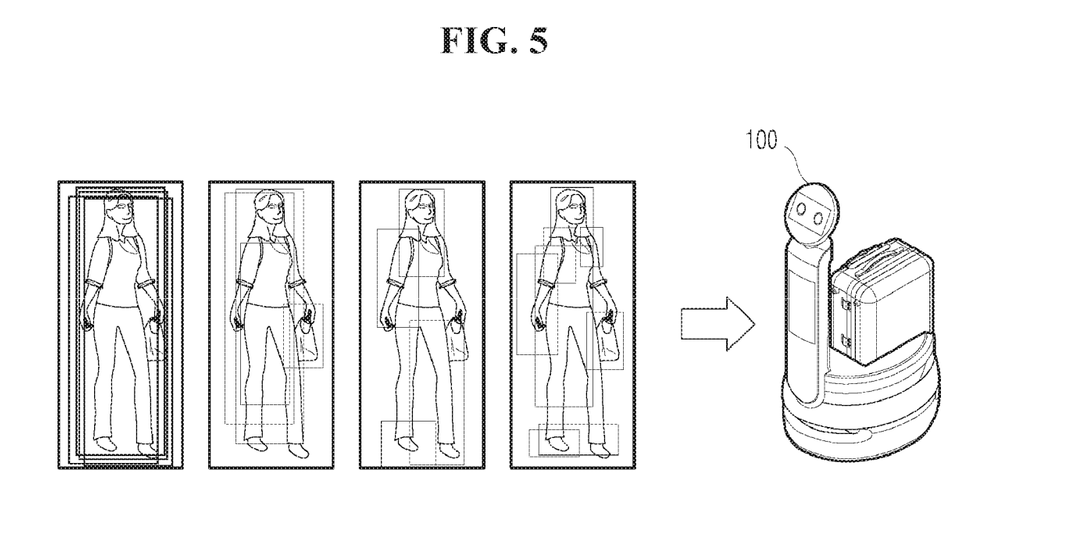
FIG. 5 is a diagram for exemplarily explaining a user identification process according to an embodiment.

Hereinafter, the user identification process will be described with reference to FIG. 5. In particular, FIG. 5 is a diagram for explaining a user identification process according to an embodiment.

In more detail, the robot 100 can analyze a user feature from the video of the user acquired when pairing in step S430 under the control of the processor 180. In the video of the user illustrated in FIG. 5, the robot 100 can analyze a user feature from body type information such as height or body proportion, clothes worn by a user, attire such as shoes, hats, and accessories, and objects in hands. For example, the robot 100 can extract a user feature while widely varying the position and size of a region of interest (ROI) under the control of the processor 180.

Subsequently, the robot 100 analyzes a video capturing the surroundings of the robot 100 in step S430 and identifies a paired user from the corresponding video. That is, the robot 100 identifies a paired user from a video capturing the surroundings based on the user feature extracted from the video of the user previously under the control of the processor 180.

In step S430, the robot 100 can identify the paired user from the video capturing the surroundings using a learning model based on an artificial neural network stored in the memory 170 under the control of the processor 180. For example, the learning model may be an object recognition model that classifies a user feature extracted by various feature extraction algorithms using machine learning. The learning model may also be an object recognition model based on deep learning such as a convolutional neural network (CNN). In still another example, the robot 100 can recognize an object in a given video and determine a location of an object through a user identification process.

In response to the identification being successful, the processor 180 continues to perform the task in step S440. Also, in response to the identification failing, the processor 180 starts a user estimation process. The user estimation process will be described below with reference to FIG. 7.

Figure 7:
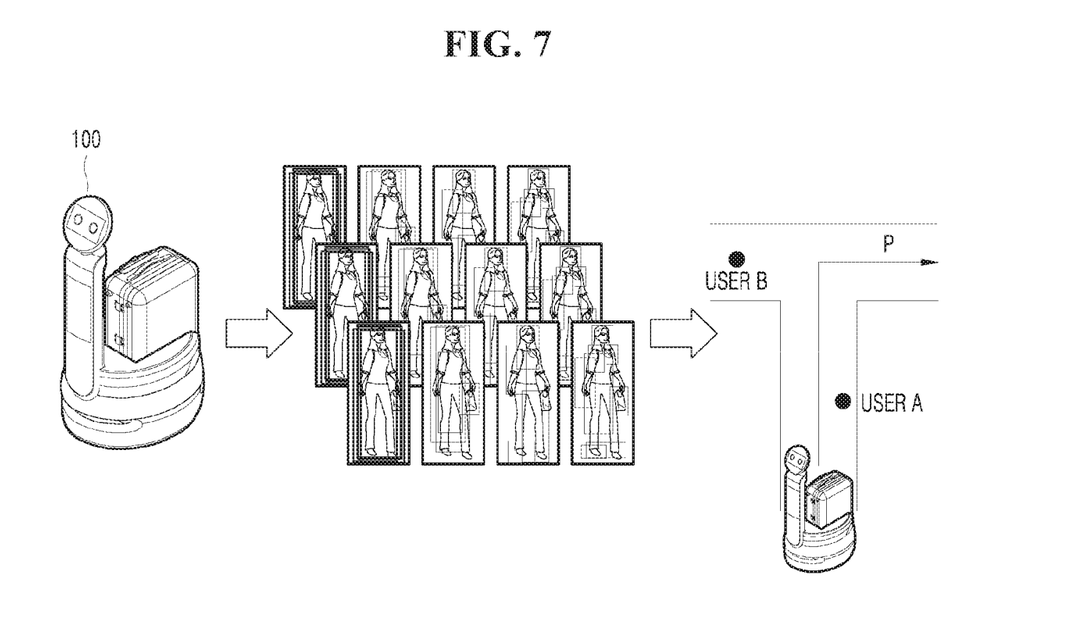
FIG. 7 is a diagram for exemplarily explaining a user estimation process according to an embodiment.

In particular, FIG. 7 is a diagram for explaining a user estimation process according to an embodiment. In particular, the robot 100 can perform a user tracking based on the current route information when the user identification fails in step S430. To this end, the robot 100 can utilize destination information or route information included in service information according to a service request. For example, the processor 180 can create route information based on map data stored in the memory 170.

That is, in step S430, in response to a user not being identified from the video in step S430, the robot 100 can estimate a candidate moving in the movement direction according to the route information among at least one candidate identified in the video as a user paired with the robot 100. The robot 100 can estimate, as a paired user, a candidate moving in a movement direction according to the predetermined route information among at least one candidate identified from a video capturing the surroundings under the control of the processor 180. For example, if user identification is impossible due to similar attire or body type among candidates, the robot 100 can estimate who a paired user is among at least one candidate through a user estimation process under the control of the processor 180.

In the example of FIG. 7, the robot 100 can estimate, as a paired user, candidate A moving in a movement direction according to the predetermined route information P among candidate A and candidate B identified in the video. In step S440, the robot 100 can perform a task corresponding to a service request for the user paired in step S430 based on the service information acquired in step S420.

The robot 100 can determine a task necessary for providing a service requested by a user and perform the determined task. Here, the task corresponding to the service request means a task that needs to be performed to provide a service requested by a user. Further, the task includes a series of operations that the robot 100 is capable of performing.

In addition, the robot 100 can complete a given task by performing a series of operations that the robot 100 itself is capable of performing. The operation that the robot 100 is capable of performing can be determined according to the performance and/or type of the robot 100. Further, the robot 100 can determine a series of operations necessary to complete a given task in consideration of the performance and/or type of the robot 100.

In step S440, the robot 100 can perform a task corresponding to a service request based on service information of a service request of a user. The task may include a plurality of tasks. In one example, the robot 100 can simultaneously perform a plurality of tasks under the control of the processor 180.

In step S440, the robot 100 can perform a task using route information created based on map data stored in the memory 170 under the control of the processor 180. In step S440, the robot 100 can also perform additional tasks necessary to complete a task according to the result of the user identification in step S430 under the control of the processor 180. For example, the robot 100 performing a route guide task in step S440 can perform a notification task for transmitting a notification message to a user as an additional task in response to the user identification failing in step S430.

In addition, the service information can include an execution condition of a task. As described above, the service information may include service detail information, user information, and service status information. Hereinafter, exemplary performance of tasks will be described with reference to FIG. 6.

Figure 6:
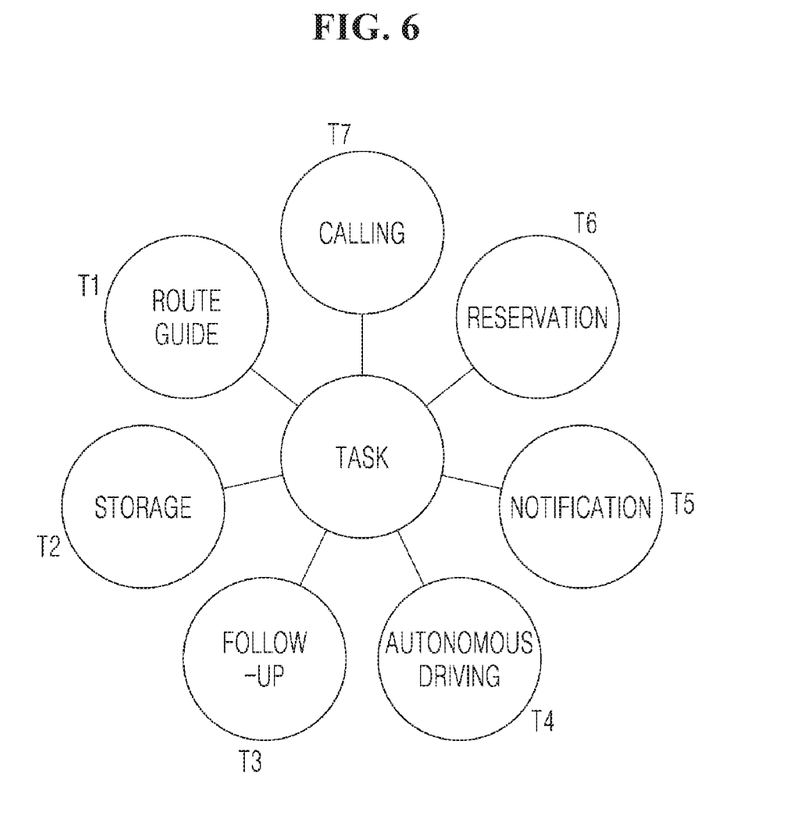
FIG. 6 is a diagram showing an exemplary task.

In more detail, FIG. 6 is a diagram showing an exemplary task. As described above, the robot 100 can perform a task according to a service requested by a user. The task may include a route guide task T1, a storage task T2, a follow-up task T3, an autonomous driving task T4, a notification task T5, a reservation task T6, and a calling task T7. Such tasks are exemplary and the tasks that the robot 100 is capable of performing are not limited thereto.

In addition, the robot 100 can perform one task or a plurality of tasks as needed. For example, the robot 100 can perform a plurality of tasks sequentially or at the same time in parallel. The robot 100 can also create and perform a task corresponding to a service request. In another example, the robot 100 can receive task information created by the server 300 through the transceiver 110 and perform a task based on the received task information.

Further, the robot 100 can perform the route guide task T1. In particular, the route guide task T1 is a task for guiding a user from a departure to a destination. The robot 100 can create route information from a departure to a destination based on the map data stored in the memory 170 under the control of the processor 180, and perform the route guide task T1 for a paired user while moving along the route information.

In addition, the service information according to a user request for a route guide service may include destination information. The robot 100 can then guide a paired user to a place indicated by the destination information included in the service information. The robot 100 can also create route information from a departure (for example, current location) to a destination based on map data stored in the memory 170 under the control of the processor 180, create a route guide task T1 guiding a paired user according to the created route information, and perform the same.

In addition, the server 300 can create route guide task information including route information to a place indicated by destination information and transmit the created information to the robot 100 in step S420. In this instance, the robot 100 performs the route guide task T1 based on the route guide task information received through the transceiver 110.

The service information according to a user request for a route guide service may further include a route guide request time and departure information. Here, the route guide request time may be included in the service information as service scheduled start time information or service reservation information. The robot 100 can then move to a place indicated by the departure information at a time of request for guidance.

For example, the robot 100 moves to a place indicated by departure information at a time of request for guidance in order to perform the route guide task T1 that takes a user to the facility corresponding to the facility reservation for use, and waits for a user. Here, the robot 100 can confirm whether a user is in a place indicated by the departure information, and move to the place indicated by the departure information at a time of request for guidance when a user is at a departure. For example, the robot 100 can receive user information from the server 300 and confirm whether a user is at a departure.

In addition, the robot 100 identifies the paired user by performing step S430 while performing the route guide task T1 in step S440. When the identification of the paired user fails in step S430, the robot 100 can create and perform the autonomous driving task T4 and/or the notification task T5 as additional tasks.

The robot 100 can also perform the storage task (T2) along with the route guide task T1. Task A entails Task B, which means that Task B is derived from Task A and created as needed, and Task B is performed along with Task A. The robot 100 can thus perform the storage task T2.

In particular, the storage task T2 is a task for storing at least one article in a container of the robot 100. To this end, the robot 100 may include at least one container. The robot 100 can also perform the storage task T2 for a set time according to the service period information included in the service information. Further, the robot 100 can transport the stored article to a destination according to the destination information included in the service information.

In one example, the robot 100 can perform the storage task T2 along with the route guide task T1 according to a user request. In this instance, the storage task T2 also functions as a transport task for transporting at least one article loaded in at least one container of the robot 100 from a departure to a destination of the route guide task T1.

In addition, the service information according to a user request for article storage service includes destination information of the stored article. If the storage and transportation of the article is accompanied by the route guide service request, the destination of the article can be set as the destination of the route guide service T1.

Further, the robot 100 can determine whether a user loads and unloads articles in a container by using a weight sensor among the sensors 120. When the loading of the articles is completed, the robot 100 fixes the articles.

In response to a user not being identified in step S430 before the robot reaches the place indicated by the destination information while performing the storage task T2 in step S440, the robot 100 can enter a security mode under the control of the processor 180. When the robot 100 enters the security mode, the robot 100 operates a locking device installed in the container to lock the container. When a third party who is not a paired user tries to move the stored articles, the robot 100 can output an alarm via the speaker 143. The robot 100 can also release the security mode when the paired user re-authenticates the service identifier or the biometric information.

When the robot 100 reaches the destination, the robot 100 can automatically unlock the container and check the unloading of the articles through a weight sensor of the sensors 120, and then return to the standby position. Here, before unlocking, the robot 100 can request a service identifier or a biometric information authentication to confirm whether the paired user is in a destination.

In addition, the robot 100 identifies a user by performing step S430 while performing the storage task T2 in step S440. In response to the identification of the user failing in step S430 for a predetermined amount of time, the robot 100 can create and perform the autonomous driving task T4 and/or the notification task T5 as additional tasks.

The robot 100 can also perform the follow-up task T3. In particular, the follow-up task T3 is a task for the robot 100 to follow a paired user. In one example, the follow-up task T3 can be performed as a part of the route guide task T1. According to the user request, the follow-up task T3 can be accompanied by the storage task T2.

Also, the service information according to the request for follow-up service may include route information from a departure to a destination. The robot 100 performing the follow-up task T3 can thus be configured to follow a paired user based on route information under the control of the processor 180.

In response to a user not being identified in step S430 while performing the follow-up task T3 in step S440, the robot 100 can be further configured to estimate, as a paired user, a candidate moving in a movement direction according to route information among at least one candidate identified in the video of step S430. Here, the robot 100 can follow the estimated user under the control of the processor 180. This corresponds to the user estimation described above with reference to FIG. 7.

In addition, the robot can may perform the autonomous driving task T4. In particular, autonomous driving task T4 is a task in which the robot 100 moves by itself according to route information from a departure to a destination. The autonomous driving task T4 can also be created and performed along with the storage task T2.

In addition, as described above, the robot 100 may include at least one container for storing articles. When the robot 100 performs the storage task T2, the destination information of the articles stored in the container may be included in the service information.

In response to a user not being identified for a predetermined amount of time in step S430 while the robot 100 is performing the storage task T2 in step S440, the robot 100 can be configured to set the articles to be delivered by autonomous driving to a place indicated by the destination information of the articles stored under the control of the processor 180. In this instance, the robot 100 can transmit a message informing that the robot 100 is in a moving state to a paired user through the transceiver 110 under the control of the processor 180. For example, the robot 100 can create and perform the notification task T5 to be described later to notify a paired user of a movement status.

The robot 100 can also perform the notification task T5. In particular, the notification task T5 is a task for notifying a user of status information about the robot 100. To this end, the robot 100 can transmit a notification message to a user through the transceiver 110, output an alarm sound through the speaker 143, and/or display a notification message and cause the screen to blink through the display 132. The notification task T5 can also be performed along with other tasks in order to give notification of status information of the robot 100 during the performance of other tasks.

In response to a user not being identified in step S430 while the robot 100 is performing the task corresponding to the service request in step S440 under the control of the processor 180, the robot 100 can transmit a notification message indicating the status information of the robot to the user through the transceiver 110. The notification message may include current location and status information of the robot.

For example, the robot 100 can transmit a notification message to the terminal 200 of a paired user based on the user contact information of the service information. For example, the robot 100 can transmit a status in which a paired user is not identified to the server 300 through the transceiver 110, and the server 300 can transmit the current location and status information of the robot to the terminal 200 of the user in response to the user continuously veering off course for a predetermined amount of time.

The robot 100 can also perform the reservation task T6. In particular, the reservation task T6 is a task for providing a reserved service in response to a service reservation of a user. The robot 100 can perform various tasks provided by the robot 100 as a reservation task T6.

In one example, the service information according to the reservation service request of a user may include a reservation time and reservation task information. The robot 100 can derive and create the reservation task T6 to operate according to the reservation task information on a reservation time under the control of the processor 180. The robot 100 can also perform the reservation task T6 on a reservation time under the control of the processor 180.

In one example, the service information according to the reservation service request of a user includes reservation detailed information, and the robot 100 can transmit a reservation request including reservation detailed information to the server 300 under the control of the processor 180. Further, the reservation detailed information may include a reservation time and a reservation place. When the server 300 receives a reservation request, the server 300 can proceed with the reservation based on the reservation detailed information. The server 300 can also check reservation availability and waiting time, and notify a user of the reservation result including the waiting time information through the robot 100 or the terminal 200 of the user.

In addition, the reservation task T6 may involve a route guide task T1 for guiding a user to a reservation place on a reservation time. Under the control of the processor 180, the robot 100 can display reservation options provided at a reservation place through the display 132 at the start of the route guide task T1 to a reservation place, and transmit a result of the user option selection to a reservation place through the transceiver 110. For example, if a reservation place is a restaurant, the robot 100 can display a menu on the display 132 before the start of the route guide task T1, and transmit the menu selected by the user to the restaurant at the start of the route guide task T1.

In addition, the robot 100 can also perform the calling task T7. In particular, the calling task T7 is a task of calling another robot 100 when a user requests a service from the robot 100 currently performing the task. Further, the service information according to the call service request includes server information, and the robot 100 can transmit a call message including current location information to the server 300 based on the server information through the transceiver 110 under the control of the processor 180. In this instance, the server 300 is a server 300 having server information as an address.

The server 300 receiving the call message 300 can dispose the available robot 100 with location information included in the call message. For example, the available robot 100 can be selected among the robots waiting at a waiting place as an idle robot or in a location closest to the current position. Further, the available robot 100 selected according to the call message 300 can arrive at the current location of a user and proceed from step S410.

Figure 8:
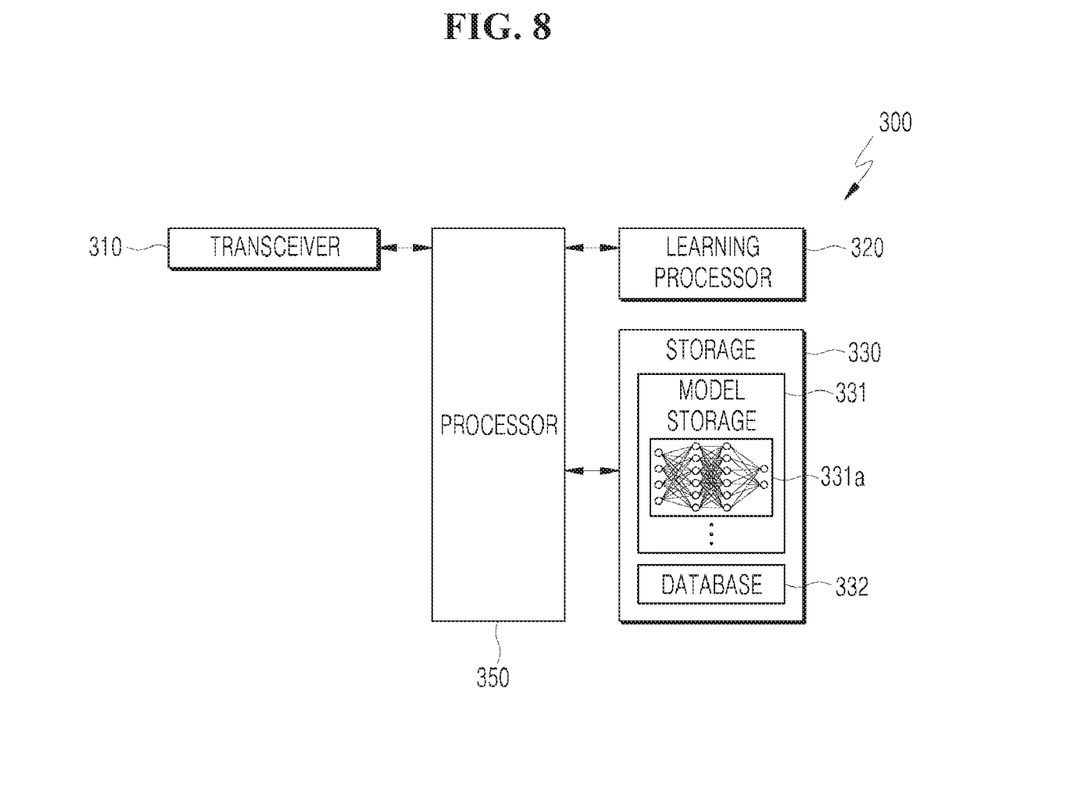
FIG. 8 is a block diagram of a server according to an embodiment.

Next, FIG. 8 is a block diagram of a server according to an embodiment of the present disclosure. The server 300 may refer to a control server for controlling the robot 100. For example, the server 300 may be a central control server for monitoring a plurality of robots 100. The server 300 can store and manage status information of the robot 100. For example, the status information may include location information, operation mode, driving route information, past service history information, and remaining battery level information. The server 300 may decide on a robot to respond to a user service request.

In this instance, the server 300 can consider the status information of the robot 100. For example, the server 300 can decide on an idle robot 100 located nearest to the user as the robot 100 to respond to the user service request. Also, the server 300 can determine the robot 100 to process a service request of a user in consideration of past service history information. In still another example, the server 300 can determine the robot 100 that has been disposed to a user in the past as the robot 100 that will process a service request of a user.

In addition, the server 300 can refer to a device for training an artificial neural network using a machine learning algorithm or using a trained artificial neural network. Here, the server 300 may include a plurality of servers to perform distributed processing, or may be defined as a 5G network. Further, the server 300 may be included as a component of the robot 100 in order to perform at least a portion of AI processing together.

As shown in FIG. 8, the server 300 may include a transceiver 310, a learning processor 320, a storage 330, and a processor 340. In particular, the transceiver 310 can transmit and receive data to and from an external device, such as the robot 100. For example, the transceiver 310 can receive a service identifier from the robot 100 and transmit service information in response thereto. The transceiver 310 can also receive a video for user identification from the robot 100 and transmit the extracted feature information of the user to the robot 100 in response thereto. Further, the transceiver 310 can store the video of a user received from the robot 100 in a user database.

The storage 330 may include a model storage 331 storing a model (or an artificial neural network 331a) which is being trained or has been trained via the learning processor 320. For example, the storage 330 can store a learning model that is being trained or has been trained.

In addition, the learning processor 320 can train the artificial neural network 331a by using learning data. The learning model can also be used while mounted in the server 300 of the artificial neural network, or be used while mounted in an external device such as the robot 100, or the like. Further, the learning model may be implemented as hardware, software, or a combination of hardware and software. When a portion or the entirety of a learning model is implemented as software, one or more instructions, which constitute the learning model, can be stored in the storage 330.

The processor 340 can infer a result value with respect to new input data using the learning model, and generate a response or control command based on the inferred result value. For example, the processor 340 can extract a feature from a video of a user using a learning model. That is, the processor 340 can identify a user from a video capturing the surroundings by using a learning model. In another example, the processor 340 can determine whether a video of a user is a pre-registered user by using a learning model.

As described above, one embodiment provides a robot control system. In particular, the robot control system includes a server 300 that assigns a robot to process a service request of a user, and a robot 100 that performs a task corresponding to the service request.

As described above, the robot 100 may include a code reader 131 for acquiring a service identifier presented by a user, a camera 142 for capturing a video, a transceiver 110 for receiving service information associated with a service identifier from a server 300, and a processor 180. Here, the processor 180 can be configured to analyze a video captured by the camera 142 to identify a user who has presented a service identifier from the video, and perform a task corresponding to a service request for the user based on service information.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

Also, the order of individual steps in methods disclosed in the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

What is claimed is:

1. A robot comprising:
    an input interface configured to receive a service identifier in response to a service request of a user;
    a camera;
    a transceiver configured to receive service information associated with the service identifier; and
    a processor configured to:
        determine whether the service identifier is valid, when the service information is received,
        identify the user who has presented the service identifier from a video using an artificial neural network based learning model, when the service identifier is valid,
        in response to successfully identifying the user, control the camera to capture a user video of the user who has presented the service identifier,
        register, in a memory associated with the robot, the user in the user video as being paired with the robot, and
        perform a task corresponding to the service request for the user based on the service information when the user is paired with the robot,
    wherein the task comprises a route guide task and the service information comprises destination information,
    wherein the processor is further configured to control the robot to guide the user to a place indicated by the destination information,
    wherein the task comprises a route guide task and the service information comprises a guide request time and departure information,
    wherein the processor is further configured to control the robot to move to a place indicated by the departure information on the guide request time,
    wherein the task further comprises an autonomous driving task, and the service information comprises destination information of at least one article stored in a container of the robot, and
    wherein the processor is further configured to control the robot to deliver the at least one article by autonomous driving to a place indicated by the destination information in response to the user not successfully being identified during a predetermined amount of time.

2. The robot of claim 1, wherein the processor is further configured to:
    output a message informing that the service identifier is invalid, when the service identifier is invalid.

3. The robot of claim 1, wherein the processor is further configured to control the robot to perform the task by using route information created based on map data stored in a memory associated with the robot.

4. The robot of claim 1, wherein the processor is further configured to control the robot to enter a security mode in response to the user not being successfully identified from the video.

5. The robot of claim 1, wherein the processor is further configured to control the robot to perform at least one additional task necessary to complete the task according to whether or not the user is successfully identified.

6. The robot of claim 1, wherein the task comprises a storage task and the service information comprises destination information of at least one article stored in a container of the robot, and
    wherein the processor is further configured to control the robot to enter a security mode in response to the user not successfully being identified from the video before the robot reaches a place indicated by the destination information.

7. The robot of claim 1, wherein the task comprises a follow up task and the service information comprises route information from a departure to a destination, and
    wherein the processor is further configured to control the robot to follow the user based on the route information.

8. The robot of claim 7, wherein the processor is further configured to control the robot to follow a candidate moving in a movement direction according to the route information among at least one candidate identified from the video, in response to the user not successfully being identified from the video.

9. The robot of claim 1, wherein the task comprises a notification task, and
    wherein the processor is further configured to control the robot to transmit a notification message indicating status information of the robot to the user in response to the user not successfully being identified from the video.

10. The robot of claim 1, wherein the task comprises a reservation task and the service information comprises a reservation time and reservation place information, and
wherein the processor is further configured to control the robot to transmit a reservation request including the reservation time and reservation place information to a server.

11. The robot of claim 1, wherein the task comprises a call task and the service information comprises server information, and
wherein the processor is further configured to control the robot to transmit a call message including current location information to the server based on the server information, the server having the server information as an address.

12. The robot of claim 1, wherein the task comprises a plurality of tasks, and
wherein the processor is further configured to control the robot to perform the plurality of tasks simultaneously.

13. A method of controlling a robot, the method comprising:
receiving, via an input interface of the robot, a service identifier in response to a service request of a user;
receiving, via a transceiver of the robot, service information associated with the service identifier;
capturing, via a camera of the robot, a video including the user who has presented the service identifier;
determining, via a processor of the robot, whether the service identifier is valid;
identifying, the processor, the user who has presented the service identifier from the video using an artificial neural network based learning model, when the service identifier is valid;
in response to successfully identifying the user, controlling the camera to capture a user video of the user who has presented the service identifier;
registering, in a memory associated with the robot, the user in the user video as being paired with the robot;
performing, via the processor, a task corresponding to the service request for the user based on the service information when the user is paired with the robot,
wherein the task comprises a route guide task and the service information comprises destination information,
wherein the method further comprises, controlling, via the processor, the robot to guide the user to a place indicated by the destination information,
wherein the task comprises a route guide task and the service information comprises a guide request time and departure information,
wherein the method further comprises, controlling, via the processor, the robot to move to a place indicated by the departure information on the guide request time,
wherein the task further comprises an autonomous driving task, and the service information comprises destination information of at least one article stored in a container of the robot, and
wherein the method further comprises, controlling, via the processor, the robot to deliver the at least one article by autonomous driving to a place indicated by the destination information in response to the user not successfully being identified during a predetermined amount of time.

14. The method of claim 13, further comprising:
outputting a message informing that the service identifier is invalid, when the service identifier is invalid.

15. The method of claim 13, further comprising:
controlling, via the processor, the robot to enter a security mode in response to the user not being successfully identified from the video.

16. The method of claim 13, wherein the service information comprises route information from a departure to a destination, and
wherein the identifying of the user comprises estimating, as the user, a candidate moving in a movement direction according to the route information among at least one candidate identified from the video, in response to the user not being identified from the video.

17. A robot control system, comprising:
a server configured to assign a robot to process a service request; and
a robot configured to perform a task corresponding to the service request,
wherein the robot comprises:
an input interface configured to receive a service identifier in response to a service request of a user;
a camera;
a transceiver configured to receive service information associated with the service identifier; and
a processor configured to:
determine whether the service identifier is valid, when the service information is received, identify the user who has presented the service identifier from a video using an artificial neural network based learning model, when the service identifier is valid,
in response to successfully identifying the user, control the camera to capture a user video of the user who has presented the service identifier,
register, in a memory associated with the robot, the user in the user video as being paired with the robot, and
perform a task corresponding to the service request for the user based on the service information when the user is paired with the robot,
wherein the task comprises a route guide task and the service information comprises destination information,
wherein the processor is further configured to control the robot to guide the user to a place indicated by the destination information,
wherein the task comprises a route guide task and the service information comprises a guide request time and departure information,
wherein the processor is further configured to control the robot to move to a place indicated by the departure information on the guide request time,
wherein the task further comprises an autonomous driving task, and the service information comprises destination information of at least one article stored in a container of the robot, and
wherein the processor is further configured to control the robot to deliver the at least one article by autonomous driving to a place indicated by the destination information in response to the user not successfully being identified during a predetermined amount of time.

* * * * *